United States Patent
Li et al.

(10) Patent No.: US 8,208,896 B2
(45) Date of Patent: *Jun. 26, 2012

(54) METHOD, APPARATUS, AND SYSTEM FOR IMPLEMENTING POLICY AND CHARGING CONTROL

(75) Inventors: Yan Li, Shenzhen (CN); Hui Ni, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 106 days.

This patent is subject to a terminal disclaimer.

(21) Appl. No.: 12/483,697

(22) Filed: Jun. 12, 2009

(65) Prior Publication Data

US 2009/0254494 A1    Oct. 8, 2009

Related U.S. Application Data

(63) Continuation of application No. PCT/CN2008/071575, filed on Jul. 8, 2008.

(30) Foreign Application Priority Data

Jul. 24, 2007    (CN) .......................... 2007 1 0136346

(51) Int. Cl.
*H04M 11/00*    (2006.01)
(52) U.S. Cl. ..................... 455/406; 455/405; 455/456.5; 370/328
(58) Field of Classification Search .................. 455/405, 455/406, 456.5; 370/328
See application file for complete search history.

(56) References Cited

U.S. PATENT DOCUMENTS

| 6,836,653 B1 * | 12/2004 | Kang .......................... 455/408 |
| 2005/0117586 A1 | 6/2005 | Ikeda et al. |
| 2005/0213721 A1 | 9/2005 | Hakala et al. |

FOREIGN PATENT DOCUMENTS

| CN | 1866840 A | 11/2006 |
| CN | 1968139 A | 5/2007 |
| CN | 1983938 A | 6/2007 |
| CN | 101001401 A | 7/2007 |
| CN | 101272274 A | 9/2008 |
| CN | 100546258 A | 9/2009 |
| CN | 100546258 C | 9/2009 |

OTHER PUBLICATIONS

International Search Report Issued in corresponding PCT Application No. PCT/CN2008/071575; mailed Oct. 23, 2008.
English Translation of previously submitted Chinese published application No. 1866840A.
English Translation of previously submitted Chinese published application No. 101001401 A1.

(Continued)

*Primary Examiner* — Wayne Cai
*Assistant Examiner* — Chuck Huynh
(74) *Attorney, Agent, or Firm* — Brinks Hofer Gilson & Lione

(57) ABSTRACT

A method for implementing a policy and charging control (PCC) is provided. The method includes: acquiring user location information; and determining a PCC rule of a user according to the acquired user location information. The PCC rule is for a policy and charging enforcement function (PCEF) to perform the corresponding PCC. Corresponding PCEF, policy control and charging rules function (PCRF), gateway, and system for implementing a PCC are also provided. Thus, the PCC based on fine-granularity location information is implemented.

12 Claims, 8 Drawing Sheets

OTHER PUBLICATIONS

3rd Generation Partnership Project; Technical Specification Group Services and System Aspects; Policy and Charging Control Architecture (Release 7). Global System for Mobile Communication. Dec. 2006.

Written Opinion of the International Searching Authority issued in corresponding PCT Application No. PCT/CN2008/071575; mailed Oct. 23, 2008.

First Office Action issued in corresponding Chinese Patent Application No. 200710136346.4, mailed Apr. 24, 2009.

Extended European Search Report issued in corresponding European Patent Application No. 08773129.5, mailed Jul. 28, 2010.

Digital Cellular Telecommunications System (Phase 2+); Universal Mobile Telecommunications System (UMTS); Telecommunication Management; Charging Management; Packet Switched (PS) domain charging (3GPP TS 32.251 version 7.4.0 Release 7), Global System for Mobile Communications. ETSI TS 132 251, V7.4.0, Jun. 2007.

3rd Generation Partnership Project; Technical Specification Group Core Network and Terminals; Policy and Charging Control over Gx reference point (Release 7), Global System for Mobile Communications. 3GPP TS 29.212, V7.0.0, Mar. 2007.

3rd Generation Partnership Project; Technical Specification Group Services and System Aspects; Policy and Charging Control Architecture (Release 7), Global System for Mobile Communications. 3GPP TS 23.203, V7.2.0, Mar. 2007.

Universal Mobile Telecommunications System (UMTS); Policy and charging control over Gx reference point (Release 7), 3GPP. ETSI TS 129 212, V7.2.0, Oct. 2007.

Extended European Search Report issued in corresponding European Patent Application No. 11177923.7, mailed Oct. 10, 2011.

Office Action issued in corresponding European Patent Application No. 08773129.5, mailed Sep. 19, 2011.

Office Action issued in corresponding Chinese Patent Application No. 200810189634.0, mailed May 18, 2011.

GSM, "3rd Generation Partnership Project; Technical Specification Group Services and System Aspects; Policy and Charging Control Architecture" (Release 7), 3GPP TS 23.203, V.7.2.0, Mar. 2007.

GSM, Digital Cellular Telecommunications System (Phase 2+); Universal Mobile Telecommunications System (UMTS); Telecommunication Management; Charging Management; Packet Switched (PS) Domain Charging (3GPP TS 32.251 version 7.4.0, Release 7) ETSI TS 132 251. V7.4.0, Jun. 2007.

GSM, Digital Cellular Telecommunications System (Phase 2+); Universal Mobile Telecommunications System (UMTS); Telecommunication Management; Charging Management; Diameter Charging Applications (3GPP TS 32.299 version 7.6.0 Release 7) ETSI TS 132 299. V7.6.0, Jun. 2007.

Office Action issued in corresponding European Patent Application No. 08773129.5, mailed Mar. 23, 2012.

\* cited by examiner

METHOD, APPARATUS, AND SYSTEM FOR IMPLEMENTING POLICY AND CHARGING CONTROL

CROSS-REFERENCE TO RELATED APPLICATION

The application is a continuation of International Application No. PCT/CN2008/071575, filed on Jul. 8, 2008, titled "METHOD, EQUIPMENT AND SYSTEM FOR IMPLEMENTING POLICY AND CHARGING CONTROL", which claims the benefit of priority to Chinese Patent Application No. 200710136346.4, filed on Jul. 24, 2007, titled "METHOD, APPARATUS, AND SYSTEM FOR IMPLEMENTING POLICY AND CHARGING CONTROL", the entire contents of all of which are incorporated herein by reference.

FIELD OF THE INVENTION

The present disclosure relates to the field of communication technology, and more particularly to a method for implementing a Policy and Charging Control (PCC), a Policy and Charging Enforcement Function (PCEF), a Policy Control and Charging Rules Function (PCRF), and a system for implementing a PCC.

BACKGROUND OF THE INVENTION

In a telecommunication system, policy control and charging control based on different services (for example, web page browsing, file downloading, and video stream on demand) need to be performed in consideration of requirements for Quality of Service (QoS) of a service, service operation, and the like.

In the research and practice of the prior art, the inventors find that in actual applications, some special application scenarios may require the PCC based on location information of fine granularity, for example, when the operator hopes to carry out post-paid or free services on users in a certain office area, or to provide an IP connectivity access network bearer of a low QoS to users in some temporary hot-spot cells so as to avoid the problem of insufficient resources resulted from too many users in the temporary hot-spot cells). However, according to the PCC defined by the current 3rd Generation Partnership Project (3GPP), when implementing the PCC, user location related information reported to a PCRF by a PCEF only contains an Internet Protocol (IP) address of a Serving General Packet Radio Service (GPRS) Support Node (SGSN) of the user and information of a mobile service network of the SGSN. The user location related information has a coarse granularity. Therefore, the PCC framework of the current 3GPP can only perform the PCC based on location information of a coarse granularity, but fails to meet the requirements for the PCC based on location information of a fine granularity in special application scenarios.

SUMMARY OF THE INVENTION

Embodiments of the present disclosure provide a method for implementing a PCC, a PCEF, a PCRF, and a system for implementing a PCC, so as to implement the PCC based on fine-granularity location information.

The following technical solutions are provided in embodiments of the present disclosure.

A method for implementing a PCC includes: acquiring user location information; and determining a PCC rule of a user according to the user location information, wherein the PCC rule is for a PCEF to perform the corresponding PCC.

A PCEF comprises a sending unit, a receiving unit, and a policy enforcement unit. The sending unit is configured to send information to a PCRF, wherein the sending unit sends user location information to the PCRF when receiving a location information sending command. The receiving unit is configured to receive information sent by the PCRF, wherein the receiving unit receives a PCC rule determined by the PCRF according to the user location information. The policy enforcement unit is configured to perform a corresponding PCC according to the PCC rule received by the receiving unit.

A PCRF comprises an acquisition unit, a decision unit, and a sending unit. The acquisition unit is configured to acquire information including user location information reported by a PCEF. The decision unit is configured to determine a PCC rule of a user, wherein the decision unit determines the PCC rule of the user according to the user location information acquired by the acquisition unit. The sending unit is configured to send information to the PCEF, wherein the information includes the PCC rule determined by the decision unit.

A system for implementing a PCC includes a PCRF and a PCEF.

The PCRF is configured to acquire user location information reported by the PCEF, determine a PCC rule of a user according to the user location information, and send the PCC rule.

The PCEF is configured to receive the PCC rule and perform the corresponding PCC according to the rule.

DETAILED DESCRIPTION OF THE EMBODIMENTS

Figure 1:
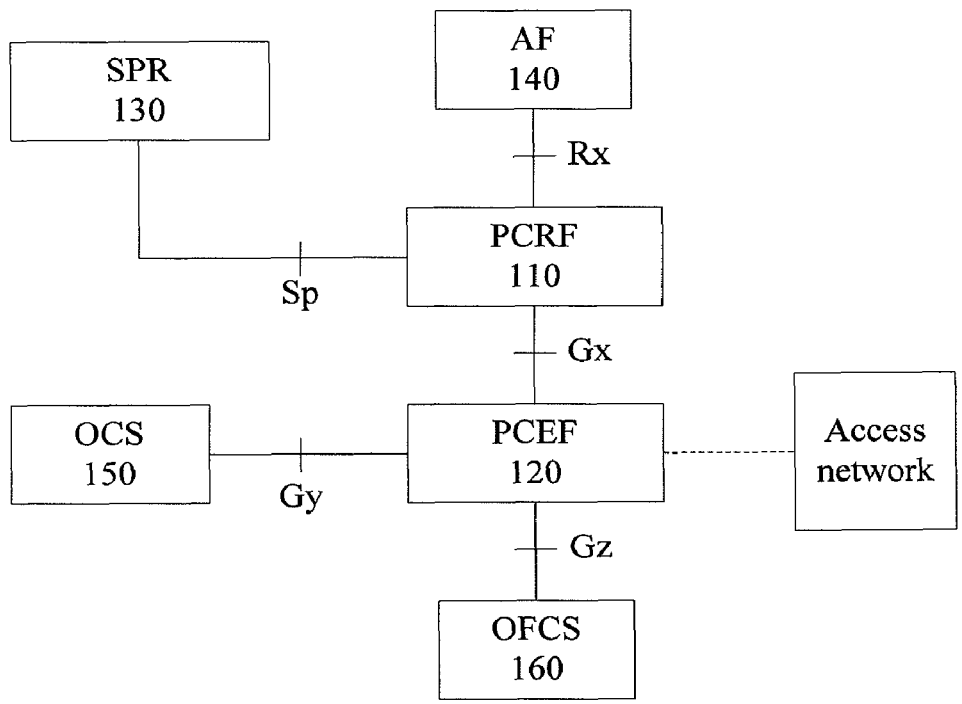
FIG. 1 is an architectural view of a PCC framework in an application scenario according to an embodiment of the present disclosure.

FIG. 1 is an architectural view of a Policy and Charging Control (PCC) framework in an application scenario according to an embodiment of the present disclosure. The PCC framework includes: a Policy Control and Charging Rules Function (PCRF) 110, a Policy and Charging Enforcement Function (PCEF) 120, a Subscription Profile Repository (SPR) 130, an Application Function (AF) 140, an Online Charging System (OCS) 150, and an Offline Charging System (OFCS) 160.

The PCRF 110 is mainly configured to make a PCC decision to determine a PCC rule of a user according to user location related information, a policy formulated by the operator, user subscription data, a service currently carried out by the user, and other information. The PCRF 110 then sends the determined PCC rule to the PCEF. The PCC rule includes a detection rule of a service data flow, whether to gate the service data flow, a QoS, and a flow-based charging rule.

The PCEF 120 is mainly configured to report the user location related information to the PCRF, and implement a detection and measurement on the service data flow, a QoS assurance of the service data flow, a traffic processing of a user plane, trigger of a session management of a control plane and other functions by carrying out the PCC rule sent by the PCRF. The PCEF is generally implemented based on a gateway and may be connected to various access networks.

The SPR 130 is mainly configured to provide the user subscription data to the PCRF.

The AF 140 is mainly configured to provide the PCRF with session information of an application layer, including information of an IP filter for identifying the service data flow, and information of a bandwidth required by an application or media.

The OCS 150 and the OFCS 160 are respectively configured to implement online charging and offline charging.

The PCEF interacts with the PCRF through a Gx interface. The AF interacts with the PCRF through an Rx interface. The SPR interacts with the PCRF through an Sp interface. The OCS and the OFCS interact with the PCRF through a Gy interface and a Gz interface respectively. The Gx interface and the Rx interface may use the Diameter protocol defined by the Internet Engineering Task Force (IETF).

Figure 2:
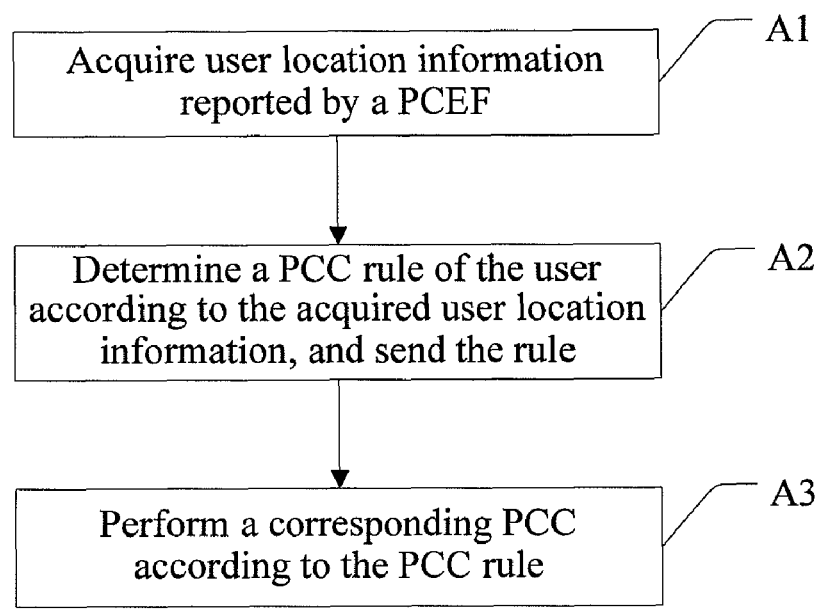
FIGS. 2-7 are respectively flow charts of the first to the sixth embodiments of a method for implementing a PCC of the present disclosure.

A first embodiment of a method for implementing a PCC of the present disclosure is as follows. As shown in FIG. 2, the method includes the following steps.

In A1, a PCRF acquires user location information reported by a PCEF.

In the embodiments of the present disclosure, the user location information mainly refers to specific location information of a user. The user location information defined in different access network technologies may be different. Here, a General Packet Radio Service (GPRS) network and a Worldwide Interoperability for Microwave Access (WiMAX) network are taken for example to illustrate the user location information. However, it can be understood that, the embodiments of the present disclosure is also applicable to other access network technologies.

In the GPRS network, the following user location information is defined:

Routing Area Identity (RAI): including a Mobile Country Code (MCC), a Mobile Network Code (MNC), a Location Area Code (LAC) and a Route Area Code (RAC) for uniquely identifying a route area (RA) formed by one or more cells having the same routing information;

Cell Global Identity (CGI): including the MCC, the MNC, the LAC, and a Cell Identity (CI); the CGI is a unique identity of a cell globally;

Service Area Identity (SAI): including the MCC, the MNC, the LAC, and a Service Area Code (SAC) for uniquely identifying a service area formed by one or more cells in the same location area (LA).

In the WiMAX network, the defined user location information includes information of a WiMAX cell and the like.

In the embodiment of the present disclosure, the PCEF may actively report the user location information. For example, the PCEF may directly report the user location information after receiving an IP Connectivity Access Network (IP-CAN) session establishment request message, or report the user location information according to a location report instruction of the PCRF. Specifically, the location report instruction may be a trigger event list including a user location information change event.

The PCEF reports the user location information according to the location report instruction of the PCRF as follows: the PCEF detects whether the user location information change event indicated in the trigger event list occurs, and if yes, the PCEF reports the changed user location information. Several specific implementation methods are given below.

In Method a, a network element (NE) of an access network reports a detected user location information change event and the changed user location information to the PCEF; the PCEF judges whether the user location information change event is a user location information change event indicated in the trigger event list, and if yes, the PCEF reports the changed user location information.

In Method b, an NE of an access network reports current user location information to the PCEF periodically; if the type of the user location information is a type of the user location information corresponding to the user location information change event indicated in the trigger event list, the PCEF compares the current user location information and recorded user location information, and reports the current user location information if the current user location information and recorded user location information are not consistent.

In Method c, when it is detected that a user location information change event occurs, an NE of an access network reports changed user location information to the PCEF; after receiving the user location information, the PCEF directly confirms that a user location change event occurs, and if the type of the user location information is a type of the user location information corresponding to the user location information change event indicated in the trigger event list, the PCEF reports the received user location.

In the embodiment of the present disclosure, the PCEF may also report the user location information according to the location report instruction of the PCRF as follows: the PCEF judges whether user location information corresponding to the user location information change event indicated in the trigger event list has been reported to the PCRF, and if not, the PCEF reports the user location information.

In the embodiment of the present disclosure, the process that the PCEF reports the user location information may be specifically implemented by reporting a Credit-Control-Request (CCR) message carrying the user location information. Taking the GPRS network for example, an optional implementation is to include a 3GPP user location information (3GPP-User-Location-Info) attribute value pair having an attribute value of CGI/SAI information and/or an RAI attribute value pair having an attribute value of RAI information in the CCR message.

In A2, a PCC rule of the user is determined according to the acquired user location information, and the PCC rule is sent.

The PCRF determines the PCC rule of the user according to the acquired user location information (the PCRF may also use the user subscription data, the operator's policy, and other information as reference when determining the PCC rule of the user); if no PCC rule is sent to the PCEF or the generated PCC rule is not consistent with that sent to the PCEF, the generated PCC rule is sent to the PCEF.

The PCRF may further determine a user location information change event of the user according to the acquired user location information (the PCRF may also use the user subscription data, the operator's policy, and other information as reference when determining a user location information change event of the user), and generate a corresponding location report instruction; if no location report instruction is sent to the PCEF or the generated location report instruction is not consistent with that sent to the PCEF, the generated location report instruction is sent to the PCEF. The location report instruction may specifically be a trigger event list including a user location information change event. After receiving the trigger event list sent by the PCRF, the PCEF detects whether the user location information change event indicated in the trigger event list occurs, and if yes, the PCEF reports the changed user location information.

In the embodiments of the present disclosure, the PCRF may send the PCC rule and the location report instruction to the PCEF through a Credit-Control-Answer (CCA) message or a Re-Auth-Request (RAR) message.

When the location report instruction is the trigger event list, the PCRF may send the trigger event list by carrying the trigger event list in the CCA message or the RAR message. Two specific implementation methods for sending the trigger event list through the CCA message or the RAR message are given below.

In Method A, the CCA message or the RAR message carrying an Event-Trigger attribute is sent. Attribute values of the Event-Trigger attribute include one or more location change events corresponding to a single user location information.

The Event-Trigger attribute is a data object of an enumerated type. Version 7.0.0 of the 3GPP TS29.212 has defined attribute values of 0-10. In the embodiments of the present disclosure, the Event-Trigger attribute may be extended based on the defined attribute values to include attribute values of location change events corresponding to a single user location information.

Based on the above definition, the trigger event list including the user location information change event is sent by including the attribute values of the location change events corresponding to the single user location information in the Event-Trigger attribute of the CCA message or the RAR message.

After receiving the CCA message or the RAR message, the PCEF reports changed user location information to the PCRF if detecting the user location information change event indicated in the Event-Trigger attribute in the message.

After receiving the CCA message or the RAR message, the PCEF may also judge whether corresponding user location information of the user location information change event indicated in the Event-Trigger attribute of the message is reported to the PCRF, and if not, the PCEF reports the user location information to the PCRF.

To make the present disclosure more comprehensible, a specific example of Method A is given below by taking the GPRS access for example.

In this example, two attribute values are added to the Event-Trigger attribute. One attribute value is RAI_CHANGE (x1) for denoting an RAI change event. The other attribute value is CGI_SAI_CHANGE (x2) for denoting a CGI/SAI change event. The x1 and x2 are different from each other and different from the attribute values that have been defined in the Event-Trigger attribute.

According to the above definition, when the Event-Trigger attribute of the CCA message or the RAR message sent to the PCEF by the PCRF includes the attribute value RAI_CHANGE (x1), it indicates that the PCRF requires the PCEF to report an RAI change; when the Event-Trigger attribute includes the attribute value CGI_SAI_CHANGE (x2), it indicates that the PCRF requires the PCEF to report a CGI/SAI change.

In Method B, the CCA message or the RAR message carrying an Event-Trigger attribute is sent. Attribute values of the Event-Trigger attribute include a location change event corresponding to all user location information.

In the embodiments of the present disclosure, the Event-Trigger attribute may be extended based on the defined attribute values to include one attribute value of the location change event corresponding to all user location information.

Based on the above definition, the trigger event list including the user location information change event is sent by including the attribute value of the location change event corresponding to all user location information in the Event-Trigger attribute of the CCA message or the RAR message.

After receiving the CCA message or the RAR message, the PCEF reports the changed user location information to the PCRF if detecting any user location information change event.

After receiving the CCA message or the RAR message, the PCEF may also judge whether all user location information are reported to the PCRF, and if a certain user location information is not reported, report the user location information to the PCRF.

A specific example of Method B is given below still by taking the GPRS access for example.

In this example, one attribute value is added to the Event-Trigger attribute. The attribute value is LOCATION_CHANGE (x) for denoting a user location information change event. The x is different from the attribute values that have been defined in the Event-Trigger attribute.

According to the above definition, when the PCRF includes the attribute value LOCATION_CHANGE (x) in the Event-Trigger attribute of the CCA message or the RAR message sent to the PCEF, it indicates that the PCRF requires the PCEF to report all user location information changes.

An inter-operator handover or inter-access technology handover may result in changed ability of the PCEF for acquiring user location information. Therefore, in the embodiment of the present disclosure, the PCRF may further determine a user location information change event of the user according to location acquisition ability information reported by the PCEF (the PCRF may also use the user location information, the user subscription data, the operator's policy, and other information as reference when determining a user location information change event of the user), so as to generate a corresponding location report instruction; and if no location report instruction is sent to the PCEF or the generated location report instruction is different from that sent to the PCEF, the generated location report instruction is sent to the PCEF. In the embodiments of the present disclosure, the location acquisition ability mainly refers to the ability of acquiring user location information.

In addition, the PCRF may also make a PCC decision again to determine a current PCC rule of the user according to the location acquisition ability information reported by the PCEF (the PCRF may also use the user location information, the user subscription data, the operator's policy, and other information as reference when determining a current PCC rule of the user) when the location acquisition ability information of the PCEF is changed.

In the embodiment of the present disclosure, the PCEF may carry the location acquisition ability information in the CCR message sent to the PCRF to report the location acquisition ability. The process may occur when an IP-CAN session is established and/or modified. Several specific implementing methods for reporting the location acquisition ability information through the CCR message are given below.

In a first method, one or more location acquisition ability attribute value pairs corresponding to a single user location information are carried in the CCR message. Attribute values of the attribute value pairs denote whether the PCEF has the ability of acquiring corresponding user location information.

In the embodiment of the present disclosure, the CCR message may be extended to include location acquisition ability attributes corresponding to a single user location information, and attribute values denoting whether the PCEF has the ability of acquiring corresponding user location information may be defined for the added location acquisition ability attributes.

A specific example of the first method is given below by taking the GPRS access for example.

In this example, two location acquisition ability attributes are added to the CCR message.

One location acquisition ability attribute is a location acquisition ability attribute corresponding to the RAI, RAI-Report-Ability, and the following two attribute values are defined for the attribute:

NONE (0) denoting that the PCEF does not have the ability of acquiring the RAI information; and RAI_REPORT (1) denoting that the PCEF has the ability of acquiring the RAI information.

The other location acquisition ability attribute is a location acquisition ability attribute corresponding to the CGI/SAI, Location-Report-Ability, and the following two attribute values are defined for the attribute:

NONE (0) denoting that the PCEF does not have the ability of acquiring the CGI/SAI information; and LOCATION_REPORT (1) denoting that the PCEF has the ability of acquiring the CGI/SAI information.

According to the above definition, when the PCEF needs to report to the PCRF that it does not have the ability of acquiring the RAI information, the RAI-Report-Ability attribute value pair having an attribute value of NONE (0) is included in the CCR message sent to the PCRF; and when the PCEF needs to report to the PCRF that it has the ability of acquiring RAI information, the RAI-Report-Ability attribute value pair having an attribute value of RAI_REPORT (1) is included in the CCR message sent to the PCRF.

Similarly, when the PCEF needs to report to the PCRF that it does not have the ability of acquiring the CGI/SAI information, the Location-Report-Ability attribute value pair having an attribute value of NONE (0) is included in the CCR message sent to the PCRF; and when the PCEF needs to report to the PCRF that it has the ability of acquiring the CGI/SAI information, the Location-Report-Ability attribute value pair having an attribute value of LOCATION_REPORT (1) is included in the CCR message sent to the PCRF.

In a second method, a location acquisition ability attribute value pair corresponding to multiple user location information is carried in the CCR message. Attribute values of the attribute value pair denote whether the PCEF has the ability of acquiring a part or all of the multiple user location information.

The CCR message may be extended to include one location acquisition ability attribute corresponding to multiple user location information, and attribute values, which denote whether the PCEF has the ability of acquiring a part or all of the multiple user location information, are defined for the added location acquisition ability attribute.

A specific example of the second method is given still by taking the GPRS access for example.

In this example, one location acquisition ability attribute of Location-Report-Ability is added to the CCR message, and the following four attribute values are defined for the attribute:

NONE (0) denoting that the PCEF does not have the ability of acquiring the user location information;

RAI_REPORT (1) denoting that the PCEF has the ability of acquiring the RAI information;

CGI_SAI_REPORT (2) denoting that the PCEF has the ability of acquiring the CGI/SAI information; and RAI_CGI_SAI_REPORT (3) denoting that the PCEF has the ability of acquiring the RAI and the CGI/SAI information.

According to the above definition, when the PCEF needs to report to the PCRF that it does not have the ability of acquiring the user location information, the Location-Report-Ability attribute value pair having an attribute value of NONE (0) is included in the CCR message sent to the PCRF; when the PCEF needs to report to the PCRF that it has the ability of acquiring the RAI information, the Location-Report-Ability attribute value pair having an attribute value of RAI_REPORT (1) is included in the CCR message sent to the PCRF; when the PCEF needs to report to the PCRF that it has the ability of acquiring the CGI/SAI information, the Location-Report-Ability attribute value pair having an attribute value of CGI_SAI_REPORT (2) is included in the CCR message sent to the PCRF; when the PCEF needs to report to the PCRF that it has the ability of acquiring the RAI and the CGI/SAI information, the Location-Report-Ability attribute value pair having an attribute value of RAI_CGI_SAI_REPORT (3) is included in the CCR message sent to the PCRF.

In a third method, a location acquisition ability attribute value pair corresponding to all user location information is carried in the CCR message. Attribute values of the attribute value pair denote whether the PCEF has the ability of acquiring all user location information.

The CCR message may be extended to include one location acquisition ability attribute corresponding to all user location information, and attribute values denoting whether the PCEF has the ability of acquiring all user location information are defined for the added location acquisition ability attribute.

A specific example of the third method is given by taking the GPRS access for example.

In this example, one location acquisition ability attribute of Location-Report-Ability is added to the CCR message, and the following two attribute values are defined for the attribute:

NONE (0) denoting that the PCEF does not have the ability of acquiring the user location information; and LOCATION_REPORT (1) denoting that the PCEF has the ability of acquiring all user location information.

According to the above definition, when the PCEF needs to report to the PCRF that the PCEF does not have the ability of acquiring the user location information, the Location-Report-Ability attribute value pair having an attribute value of NONE (0) is included in the CCR message sent to the PCRF; when the PCEF needs to report to the PCRF that the PCEF has the ability of acquiring all user location information, the Location-Report-Ability attribute value pair having an attribute value of LOCATION_REPORT (1) is included in the CCR message sent to the PCRF.

In a fourth method, a user location information attribute value pair is carried in the CCR message. Attribute values of the attribute value pair are specific values denoting that the PCEF does not have the ability of acquiring corresponding user location information or are null.

In the embodiment of the present disclosure, the user location information attribute may be extended, and the attribute values denoting that the PCEF does not have the ability of acquiring corresponding user location information may be defined.

A specific example of the fourth method is given by taking the GPRS access for example.

In this example, it is defined that attribute values of a 3GPP-User-Location-Info attribute value pair are 1 (all or a specific part thereof) or null, which denote that the PCEF does not have the ability of acquiring the CGI/SAI information; it is defined that attribute values of an RAI attribute value pair are 1 (all or a specific part thereof) or null, which denote that the PCEF does not have the ability of acquiring the RAI information.

According to the above definition, when the PCEF needs to report to the PCRF that it does not have the ability of acquiring the CGI/SAI information, the 3GPP-User-Location-Info attribute value pair having attribute values of 1 (all or a specific part thereof) or null is included in the CCR message sent to the PCRF; when PCEF needs to report to the PCRF that it does not have the ability of acquiring the RAI information, the RAI attribute value pair having attribute values of 1 (all or a specific part thereof) or null is included in the CCR message sent to the PCRF.

In A3, the PCEF performs a corresponding PCC according to the PCC rule.

The PCEF may further continue reporting the user location information according to the location report instruction of the PCRF. The details may be known with reference to the same content in A1, and will not be described here again.

In the above embodiment, the PCC rule of the user may be generated according to the user location information reported by the PCEF, so as to perform a corresponding PCC according to the PCC rule. Since the user location information in the embodiment of the present disclosure has a finer granularity than that of the IP address of the SGSN where the user resides and the information of the mobile service network of the SGGN in the prior art, the PCC based on fine-granularity location information can be realized according to the embodiment of the present disclosure.

Specific embodiments of the method for implementing a PCC in the present disclosure are illustrated in detail below with reference to specific application scenarios.

Figure 3:
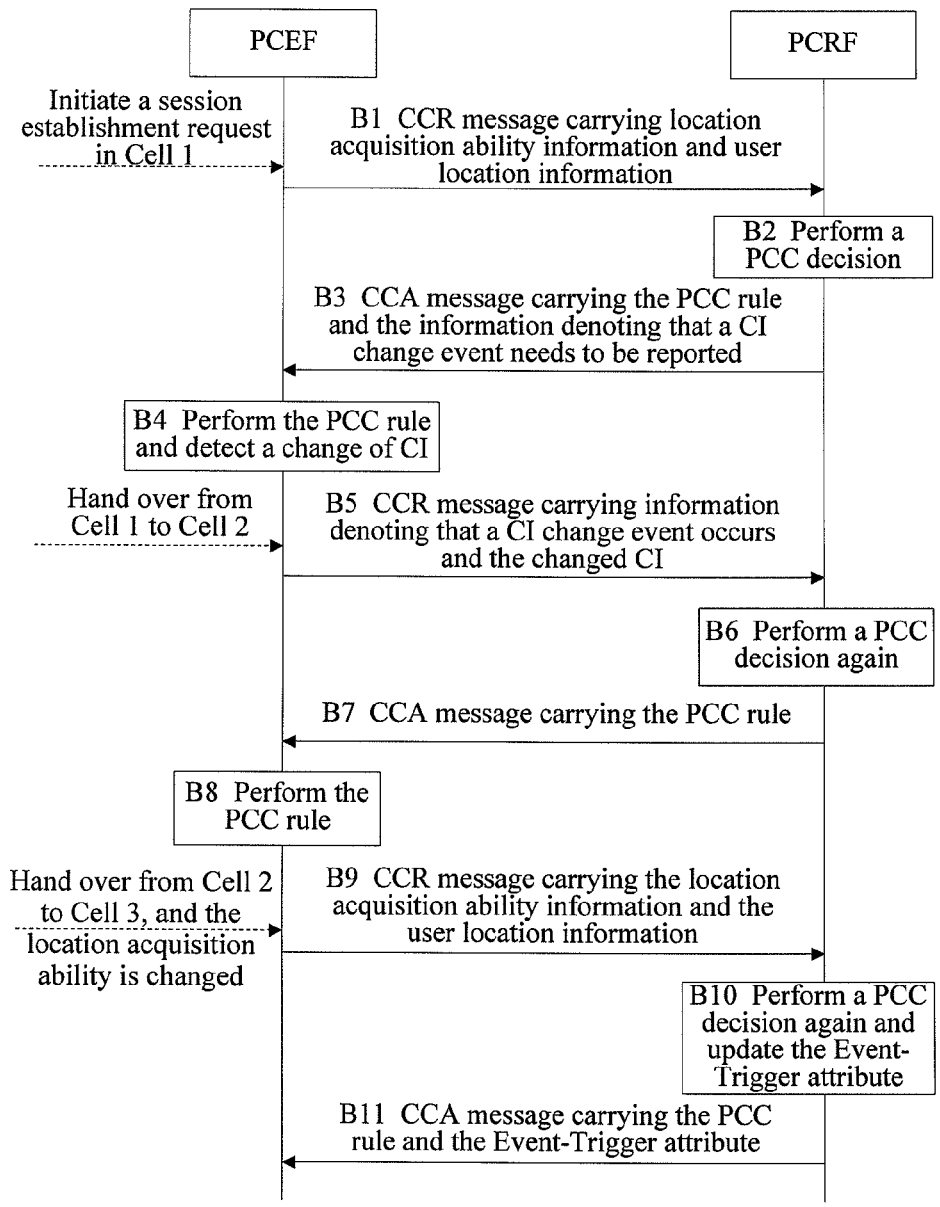

A second embodiment of the method for implementing a PCC in the present disclosure is as follows. In this embodiment, the user is handed over between cells in the GPRS network. It is assumed that Cell 1 has the ability of acquiring the CGI information, Cell 2 adjacent to Cell 1 is a cell having a special charging model (for example, the cell is a promotional area where free network access is provided), and Cell 3 adjacent to Cell 2 has the ability of acquiring the RAI information but does not have the ability of acquiring the CGI information. A PCEF uses the first method described in the first embodiment when reporting the location acquisition ability to a PCRF, and the PCRF uses Method A described in the first embodiment when sending a trigger event list to the PCEF. Referring to the flow chart in FIG. 3, the process includes the following steps.

In B1, the user initiates an IP-CAN session establishment request in Cell 1; after receiving the IP-CAN session establishment request message, the PCEF sends a CCR message to the PCRF. The CCR message includes a location acquisition ability attribute value pair corresponding to the RAI and a location acquisition ability attribute value pair corresponding to the CGI. Attribute values of the attribute value pairs are all attribute values denoting that the PCEF has the ability of acquiring corresponding user location information.

The CCR message further includes an attribute value pair carrying the current RAI information and an attribute value pair carrying the current CGI information.

In the specific implementation, the location acquisition ability attribute value pair corresponding to the RAI may be a RAI-Report-Ability attribute value pair having an attribute value of RAI_REPORT (1), and the location acquisition ability attribute value pair corresponding to the CGI may be a Location-Report-Ability attribute value pair having an attribute value of LOCATION_REPORT (1).

The attribute value pair carrying the current RAI information may be an RAI attribute value pair having an attribute value of the current RAI information, and the attribute value pair carrying the current CGI information may be a 3GPP-User-Location-Info attribute value pair having an attribute value of the current CGI information.

In B2, the PCRF makes a PCC decision to determine a PCC rule of the user according to the user location information in the CCR message (the PCRF may also use the user subscription data, the operator's policy, and other information as reference when making the PCC decision).

In this embodiment, the PCRF judges that the user may enter Cell 2 according to the current CGI information in the CCR message and the preset adjacency relationship between the cells. On the other hand, the PCRF can know that Cell 2 is the cell having the special charging model according to the operator's policy. According to the above information, the PCRF can judge that the change of the cell where the user resides needs to be detected, so as to adjust the charging rule correspondingly when detecting that the user is handed over to Cell 2. According to the location acquisition ability information in the CCR message, it can be known that the PCEF has the ability of acquiring the CGI information. Therefore, the PCRF carries information denoting that a CGI change event needs to be reported in the generated CCA message.

Here, the information denoting that a CGI change event needs to be reported may be carried in the CCA message by carrying an attribute value CGI_SAI_CHANGE (x2) in the Event-Trigger attribute of the CCA message.

In B3, the PCRF sends the CCA message carrying the determined PCC rule and the information denoting that a CGI change event needs to be reported to the PCEF.

In B4, the PCEF performs the corresponding PCC according to the PCC rule in the CCA message, and detects the change of the CGI information of the user according to the information denoting that a CGI change event needs to be reported in the CCA message.

In B5, after detecting that the CGI change event occurs, the PCEF sends a CCR message to the PCRF to report that the CGI change event occurs and report the changed CGI information.

That the CGI change event occurs may be reported by carrying an attribute value CGI_SAI_CHANGE (x2) in an Event-Trigger attribute of the CCR message, and the changed CGI information may be reported by carrying the 3GPP-User-Location-Info attribute value pair having an attribute value of the changed CGI information in the CCR message.

In B6, the PCRF makes a PCC decision again to determine a current PCC rule of the user according to the CGI change event and/or the changed CGI information in the CCR message (the PCRF may also use the user subscription data, the operator's policy, and other information as reference when making the PCC decision).

When the CGI change event detected by the PCEF is generated because the user is handed over from Cell 1 to Cell 2, the changed CGI information reported by the PCEF is the CGI information of Cell 2. Since Cell 2 is the cell having the special charging model, the PCRF uses a corresponding special charging rule in the determined PCC rule after making the PCC decision again.

In B7, the PCRF sends a CCA message including the determined PCC rule to the PCEF.

In B8, the PCEF performs a corresponding PCC according to the PCC rule in the CCA message.

In B9, after the user is handed over from Cell 2 to Cell 3, the PCEF confirms that it no longer has the ability of acquiring the CGI information but still has the ability of acquiring the RAI information, and sends a CCR message to the PCRF. The CCR message includes the location acquisition ability attribute value pair corresponding to the CGI, in which an attribute value is one denoting that the PCEF does not have the ability of acquiring the CGI information, and also includes the location acquisition ability attribute value pair corresponding to the RAI, in which an attribute value is one denoting that the PCEF has the ability of acquiring RAI information. The CCR message further includes the attribute value pair carrying the current RAI information.

The location acquisition ability attribute value pair corresponding to the RAI may be the RAI-Report-Ability attribute value pair having the attribute value of RAI_REPORT (1), and the location acquisition ability attribute value pair corresponding to the CGI may be the Location-Report-Ability attribute value pair having the attribute value of NONE (0).

The attribute value pair carrying the current RAI information may be the RAI attribute value pair having the attribute value of the current RAI information.

In B10, the PCRF makes a PCC decision again to determine a current PCC rule of the user according to the current RAI information reported in the CCR message (the PCRF may also use the user subscription data, the operator's policy, and other information as reference when making the PCC decision).

Since the PCEF does not have the ability of acquiring the CGI information in Cell 3, and the PCRF cannot acquire the CGI information of the user, the PCRF cannot make the PCC decision based on the cell granularity, but can only make the PCC decision again to determine the current PCC rule of the user according to other predetermined policies.

Further, the PCRF may also update the Event-Trigger attribute, so that the updated Event-Trigger attribute does not include the information denoting that the CGI change event needs to be reported.

In B11, the PCRF sends a CCA message including the determined PCC rule and the updated Event-Trigger attribute to the PCEF.

Figure 4:
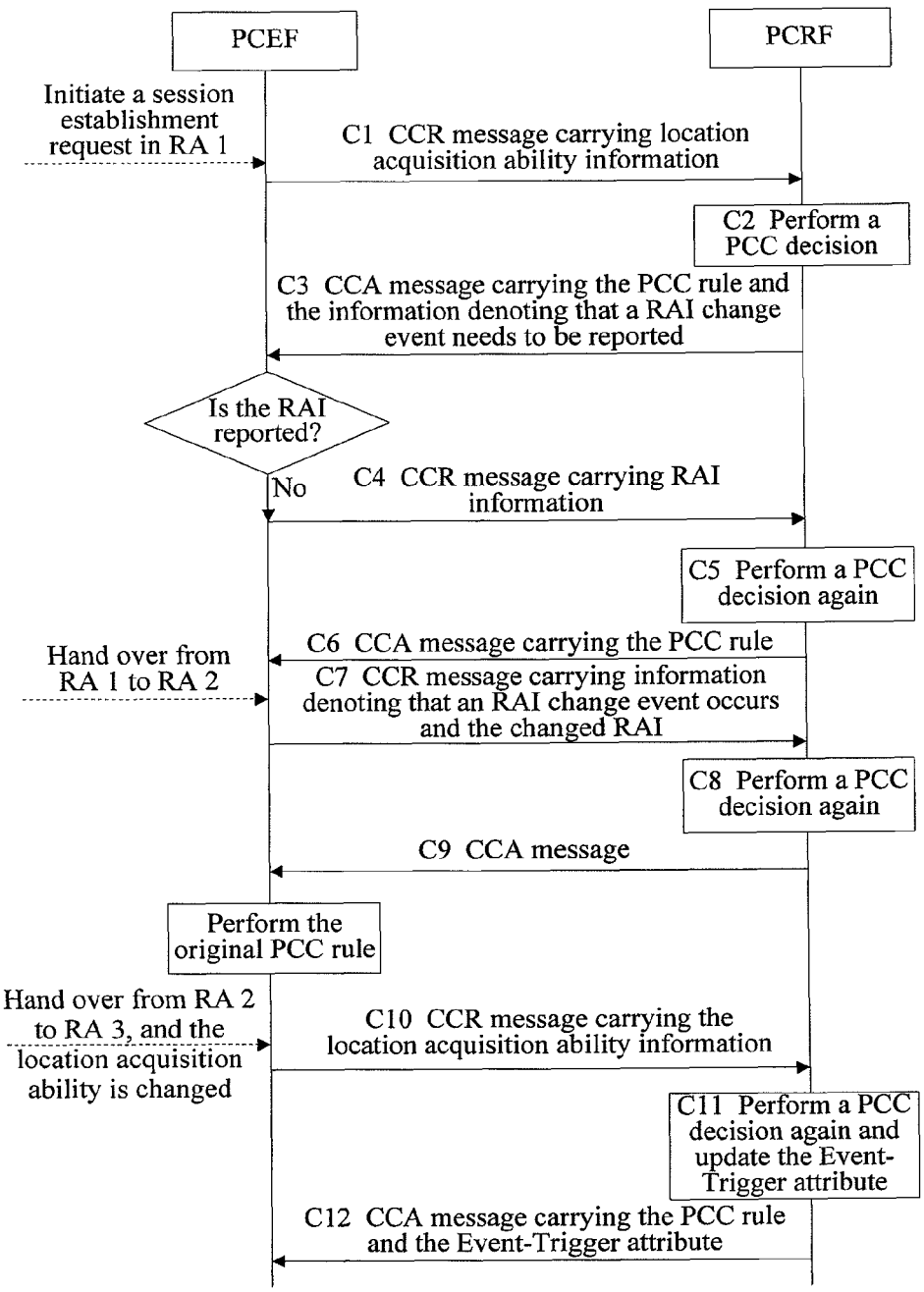

A third embodiment of the method for implementing a PCC in the present disclosure is as follows. In this embodiment, the user is handed over between RAs in the GPRS network. It is assumed that RA 1 has the ability of acquiring the RAI information, RA 2 is adjacent to RA 1, and RA 3 adjacent to RA 2 does not have the ability of acquiring the RAI information. A PCEF uses the second method described in the first embodiment when reporting the location acquisition ability to a PCRF, and the PCRF uses Method A described in the first embodiment when sending a trigger event list to the PCEF. Referring to the flow chart in FIG. 4, the process includes the following steps.

In C1, the user initiates an IP-CAN session establishment request in RA 1; after receiving the IP-CAN session establishment request message, the PCEF sends a CCR message to the PCRF. The CCR message includes a location acquisition ability attribute value pair corresponding to the RAI and CGI. Attribute values of the location acquisition ability attribute value pair are attribute values denoting that the PCEF has the ability of acquiring the RAI and CGI information.

The location acquisition ability attribute value pair corresponding to the RAI and CGI may be a Location-Report-Ability attribute value pair having an attribute value of RAI_CGI_SAI_REPORT (3).

In C2, the PCRF may make a PCC decision to determine a PCC rule of the user (the PCRF may also use the user subscription data, the operator's policy, and other information as reference when making the PCC decision).

In addition, the PCRF further determines a user location information change event that needs to be reported according to the location acquisition ability information in the CCR message (the PCRF may also use the user subscription data, the operator's policy, and other information as reference when determining a user location information change event that needs to be reported).

In this embodiment, it can be known that the PCEF has the ability of acquiring the RAI information according to the location acquisition ability information in the CCR message, and the PCRF carries information denoting that an RAI change event needs to be reported in the generated CCA message.

The information denoting that the RAI change event that needs to be reported may be carried in the CCA message by carrying an attribute value RAI_CHANGE (x1) in an Event-Trigger attribute of the CCA message.

In C3, the PCRF sends the CCA message carrying the determined PCC rule and the information denoting that the RAI change event needs to be reported to the PCEF.

In C4, after receiving the CCA message, the PCEF judges whether the RAI information corresponding to the RAI change event that needs to be reported has been reported to the PCRF, and if not, the PCEF sends a CCR message including an attribute value pair carrying the current RAI information to the PCRF.

In C5, the PCRF makes the PCC decision again to determine a PCC rule of the user according to the user location information in the CCA message (the PCRF may also use the user subscription data, the operator's policy, and other information as reference when making the PCC decision again).

In C6, a CCA message carrying the determined PCC rule is returned to the PCEF.

In C7, the user is handed over from RA 1 to RA 2; after detecting that an RAI change event occurs, the PCEF sends a CCR message to the PCRF to report that the RAI change event occurs and report the changed RAI information.

That the RAI change event occurs may be reported by carrying the attribute value RAI_CHANGE (x1) in an Event-Trigger attribute of the CCR message, and the changed RAI information may be reported by carrying an RAI attribute value pair having an attribute value of the changed RAI information in the CCR message.

In C8, the PCRF makes a PCC decision again according to the RAI change event and/or the changed RAI information reported in the CCR message (the PCRF may also us the user subscription data, the operator's policy, and other information as reference when making the PCC decision again). In this embodiment, since RA 2 does not have a special policy or special charging requirements, the PCC rule determined after the re-decision is consistent with the original one, and may not be sent to the PCEF again.

In C9, the PCRF returns a CCA message to the PCEF as a response, and the PCEF still performs a PCC according to the original PCC rule.

In C10, after the user is handed over from RA 2 to RA 3, the PCEF confirms that it no longer has the ability of acquiring the CGI and RAI information, and sends a CCR message including the location acquisition ability attribute value pair corresponding to the RAI and CGI to the PCRF, in which the attribute value is an attribute value denoting that the PCEF does not have the ability of acquiring the RAI and CGI information.

The location acquisition ability attribute value pair corresponding to the RAI and CGI may be the Location-Report-Ability attribute value pair having an attribute value of NONE (0).

In C11, the PCRF makes a PCC decision again to determine a current PCC rule of the user according to the current location acquisition ability information in the CCR message (the PCRF may also use the user subscription data, the operator's policy, and other information as reference when making the PCC decision again).

Since the PCEF does not have the ability of acquiring the RAI information in RA 3, the PCRF cannot acquire the RAI information of the user, and the PCRF cannot make the PCC decision based on RA granularity, but can make the PCC decision again to determine the current PCC rule of the user according to other predetermined policies.

Further, the PCRF may further update the Event-Trigger attribute, so that the updated Event-Trigger attribute does not include the information denoting that the RAI change event needs to be reported.

In C12, the PCRF sends a CCA message including the determined PCC rule and the updated Event-Trigger attribute to the PCEF.

Figure 5:
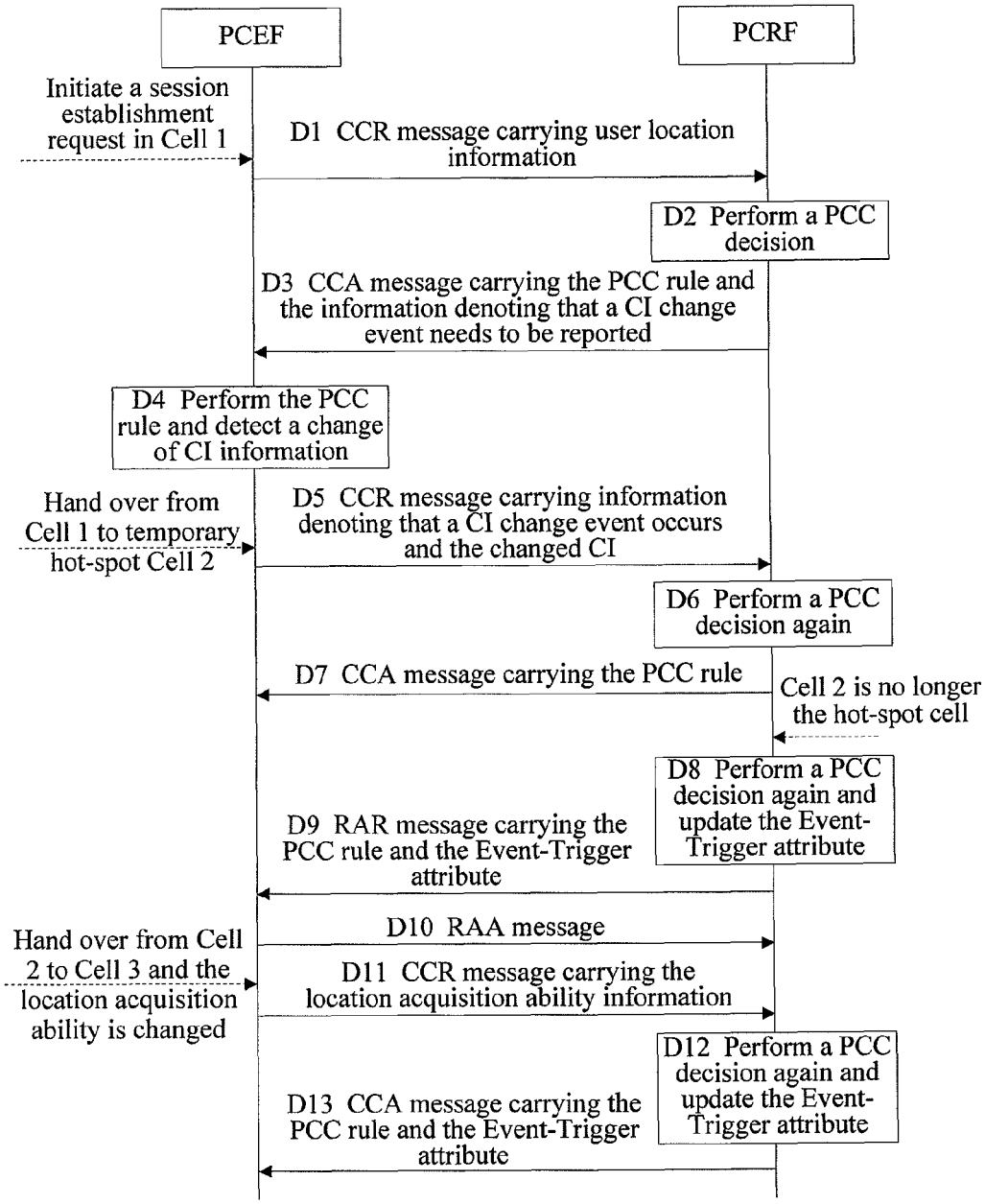

A fourth embodiment of the method for implementing a PCC in the present disclosure is as follows. In this embodiment, the user is handed over between cells in the GPRS network. It is assumed that RA 1 has the ability of acquiring the CGI information, Cell 2 adjacent to Cell 1 may be used as a temporary hot-spot cell, which has lower QoS requirements to avoid network congestion caused by too many users at this time, and Cell 3 adjacent to Cell 2 does not have the ability of acquiring the CGI information. A PCEF uses the fourth method (in this embodiment, it is assumed that an attribute value of the user location information attribute of null in the CCR message denotes that the PCEF does not have the ability of acquiring corresponding user location information) described in the first embodiment when reporting a location acquisition ability to a PCRF, and the PCRF uses Method A described in the first embodiment when sending a trigger event list to the PCEF. Referring to the flow chart in FIG. 5, the process includes the following steps.

In D1, the user initiates an IP-CAN session establishment request in Cell 1; after receiving the IP-CAN session establishment request message, the PCEF sends a CCR message to the PCRF. The CCR message includes an RAI attribute value pair having an attribute value of the current RAI information and a 3GPP-User-Location-Info attribute value pair having an attribute value of the current CGI information.

In D2, the PCRF makes a PCC rule decision to determine a PCC rule of the user according to user location information in the CCR message (the PCRF may also use the user subscription data, the operator's policy, and other information as reference when making the PCC decision).

In this embodiment, the PCRF judges that the user may enter Cell 2 according to the current CGI information of the user in the CCR message and the preset adjacency relationship between the cells. On the other hand, the PCRF can know that Cell 2 may be the temporary hot-spot cell according to the operator's policy. According to the above information, the PCRF can judge that the change of the cell where the user resides needs to be detected.

Since the attribute values of the user location information are not null in the CCR message sent by the PCEF to the PCRF, according to the assumption at the beginning of this embodiment, the PCRF can determine that the PCEF has the ability of acquiring RAI and CGI information. Therefore, the PCRF carries information denoting that a CGI change event needs to be reported in the generated CCA message.

The information denoting that the CGI change event needs to be reported may be carried in the CCA message by carrying an attribute value CGI_SAI_CHANGE (x2) in an Event-Trigger attribute of the CCA message.

In D3, the PCRF sends the CCA message carrying the determined PCC rule and the information denoting that a CGI change event needs to be reported to the PCEF.

In D4, the PCEF performs a corresponding PCC according to the PCC rule in the CCA message, and detects the change of the CGI information of the user according to the information denoting that a CGI change event needs to be reported in the CCA message.

In D5, after detecting that a CGI change event occurs, the PCEF sends a CCR message to the PCRF to report that the CGI change event occurs and report the changed CGI information.

That the CGI change event occurs may be reported by carrying the attribute value CGI_SAI_CHANGE (x2) in an Event-Trigger attribute of the CCR message, and the changed CGI information may be reported by carrying the 3GPP-User-Location-Info attribute value pair having an attribute value of the changed CGI information in the CCR message.

In D6, the PCRF makes a PCC decision again to determine the current PCC rule of the user according to the CGI change event and/or the changed CGI information reported in the CCR message (the PCRF may also use the user subscription data, the operator's policy, and other information as reference when making the PCC decision again).

When the CGI change event detected by the PCEF is generated because the user is handed over from Cell 1 to Cell 2, the changed CGI information reported by the PCEF is the CGI information of Cell 2. If the PCRF confirms that Cell 2 currently is a hot-spot cell, the PCRF uses the policy of lowering the QoS in the determined PCC rule after making the PCC decision again to avoid network congestion caused by too many users.

In D7, the PCRF sends a CCA message including the determined PCC rule to the PCEF.

In D8, when Cell 2 is no longer the hot-spot cell, the PCRF makes a PCC decision again to determine a corresponding PCC rule.

Since Cell 2 is no longer the hot-spot cell, the PCRF does not need to perform the PCC based on cell granularity, and may make the PCC decision again according to other predetermined policies, for example, may decide to perform a PCC based on RA granularity to determine the current PCC rule of the user.

Further, the PCRF may also update the Event-Trigger attribute, so that the updated Event-Trigger attribute includes information denoting that the RAI change event needs to be reported.

In D9, the PCRF sends an RAR message including the determined PCC rule and the updated Event-Trigger attribute to the PCEF.

In D10, the PCEF returns an RAA message to the PCRF as a response.

In D11, when the user is handed over from Cell 2 to Cell 3, the PCEF confirms that it no longer has the ability of acquiring the CGI and RAI information, and sends a CCR message to the PCRF. The CCR message includes the RAI attribute value pair and the 3GPP-User-Location-Info attribute value pair having attribute values of null.

In D12, the PCRF makes a PCC decision again to determine the current PCC rule of the user according to the current location acquisition ability information in the CCR message (the PCRF may also use the user subscription data, the operator's policy, and other information as reference when making the PCC decision again).

Since the PCEF does not have the ability of acquiring the user location information in Cell 3 and the PCRF cannot acquire the user location information, the PCRF cannot make the PCC decision based on the user location information, but can only make the PCC decision again to determine the current PCC rule of the user according to other predetermined policies.

Further, the PCRF may also update the Event-Trigger attribute, so that the updated Event-Trigger attribute does not include the information denoting that the CGI change event and the RAI change event need to be reported.

In D13, the PCRF sends a CCA message including the determined PCC rule and the updated Event-Trigger attribute to the PCEF.

Figure 6:
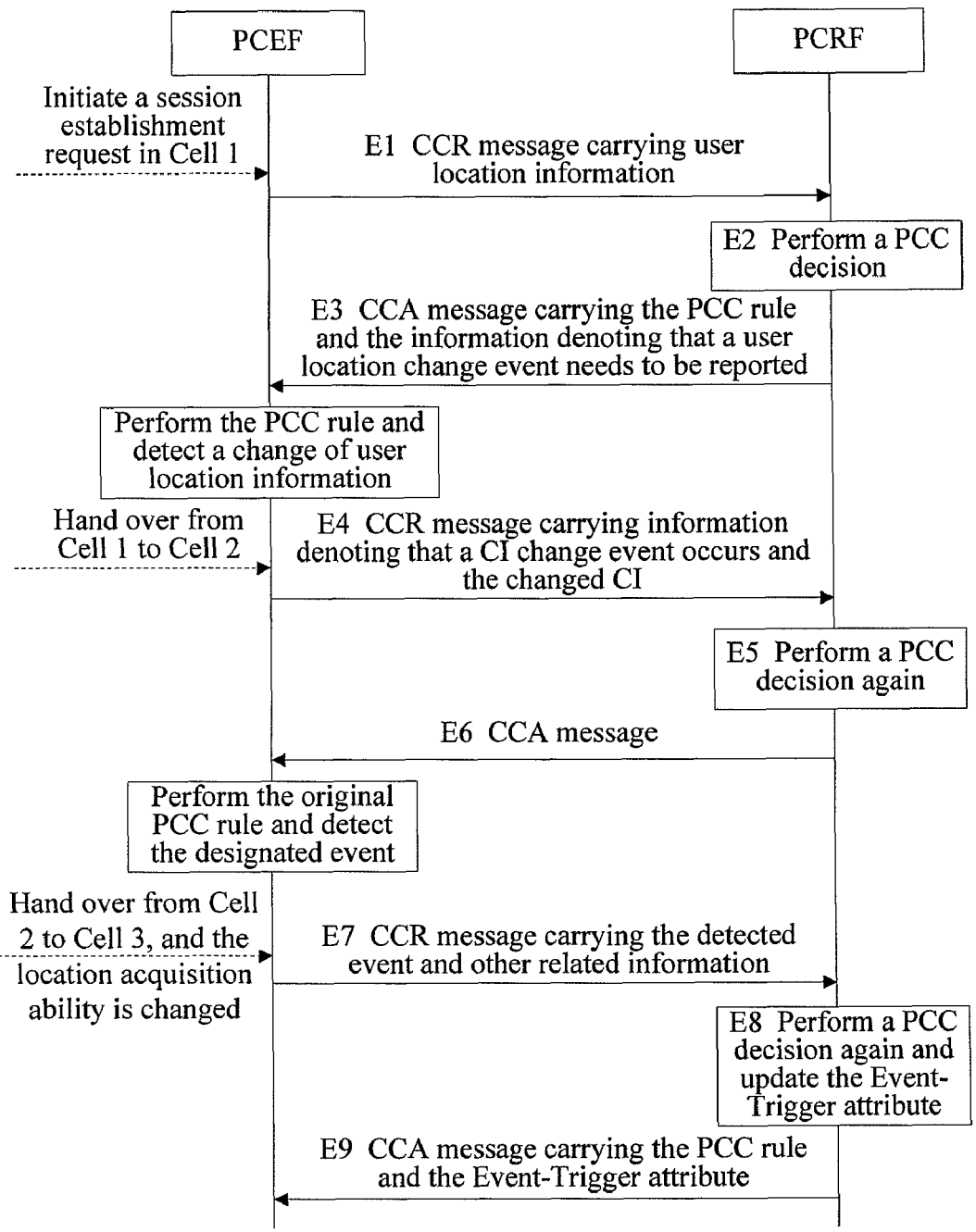

A fifth embodiment of the method for implementing a PCC in the present disclosure is as follows. In this embodiment, the user is handed over between cells in the GPRS network. It is assumed that Cell 1 has the ability of acquiring the user location information, Cell 2 is adjacent to Cell 1, and Cell 3 adjacent to Cell 2 does not have the ability of acquiring the user location information. In addition, it is assumed that a PCEF does not have the function of reporting the location acquisition ability information. In this embodiment, a PCRF uses Method B described in the first embodiment when sending a trigger event list to the PCEF. Referring to the flow chart in FIG. 6, the process includes the following steps.

In E1, the user initiates an IP-CAN session establishment request in Cell 1; after receiving the IP-CAN session establishment request message, the PCEF sends a CCR message that may carry RAI information and/or CGI information of the user to the PCRF.

The RAI information and/or CGI information of the user may be carried in the CCR message by carrying an RAI attribute value pair having an attribute value of RAI information and/or carrying a 3GPP-User-Location-Info attribute value pair having an attribute value of CGI information in the CCR message.

In E2, the PCRF makes a PCC decision to determine a PCC rule of the user according to the user location information in the CCR message (the PCRF may also use the user subscription data, the operator's policy, and other information as reference when making the PCC decision).

In addition, if the PCRF confirms that the PCEF has the location information acquisition ability, information denoting that a user location change event needs to be reported is carried in a CCA message.

The information denoting that the user location change event needs to be reported may be carried in the CCA message by carrying an attribute value LOCATION_CHANGE (x) in an Event-Trigger attribute of the CCA message.

Since the PCEF does not report whether it has the location acquisition ability to the PCRF, the PCRF mainly judges whether the PCEF has the location information acquisition ability according to other specific information (for example, an address of the SGSN and information of the operator's policy).

In E3, the PCRF sends the CCA message carrying the determined PCC rule and the information denoting that the user location change event needs to be reported to the PCEF; the PCEF performs a corresponding PCC according to the PCC rule in the CCA message, and detects a change of the user location information according to the information denoting that the user location change event needs to be reported in the CCA message.

In E4, the user is handed over from Cell 1 to Cell 2; after detecting that a CGI change event occurs, the PCEF sends a CCR message to the PCRF to report that the CGI change event occurs and report the changed CGI information.

That the CGI change event occurs may be reported by carrying an attribute value LOCATION_CHANGE (x) in an Event-Trigger attribute of the CCR message, and the changed CGI information may be reported by carrying the 3GPP-User-Location-Info attribute value pair having an attribute value of the changed CGI information in the CCR message.

The PCEF may also carry an RAI attribute value pair having an attribute value of the current RAI information in the CCR message to report the current RAI information to the PCRF.

In E5, the PCRF makes a PCC decision again according to the CGI change event and/or the changed CGI information reported in the CCR message (the PCRF may also use the user subscription data, the operator's policy, and other information as reference when making the PCC decision). In this embodiment, since Cell 2 does not have a special policy or special charging requirements, the PCC rule determined after the re-decision is consistent with the original one, and may not be sent to the PCEF again.

In E6, the PCRF returns a CCA message to the PCEF as a response, and the PCEF still performs a PCC according to the original PCC rule and detects the event indicated in the Event-Trigger attribute.

In E7, after the user is handed over from Cell 2 to Cell 3, if the PCEF detects that an event other than the user location change event indicated in the Event-Trigger attribute occurs (for example, an SGSN address change event occurs), the PCEF sends a CCR message including the detected event and other related information (for example, a changed SGSN address) to the PCRF.

In E8, the PCRF makes a PCC decision again to determine a current PCC rule of the user according to the detected event and/or other related information reported in the CCR message (the PCRF may also use the user subscription data, the operator's policy, and other information as reference when making the PCC decision again).

In addition, the PCRF may also judge whether the PCEF has the location information acquisition ability according to the detected event and/or other related information reported in the CCR message (the PCRF may also use the user subscription data, the operator's policy, and other information as reference when judging whether the PCEF has the location information acquisition ability). If not, the PCRF cannot acquire the user location information and thus cannot make the PCC decision based on the user location information, but can make the PCC decision again to determine the current PCC rule of the user according to other predetermined policies.

Furthermore, the PCRF may also update the Event-Trigger attribute, so that the updated Event-Trigger attribute no longer includes the information denoting that the user location change event is required to be reported.

In E9, the PCRF sends a CCA parameter including the determined PCC rule and the updated Event-Trigger attribute to the PCEF.

Figure 7:
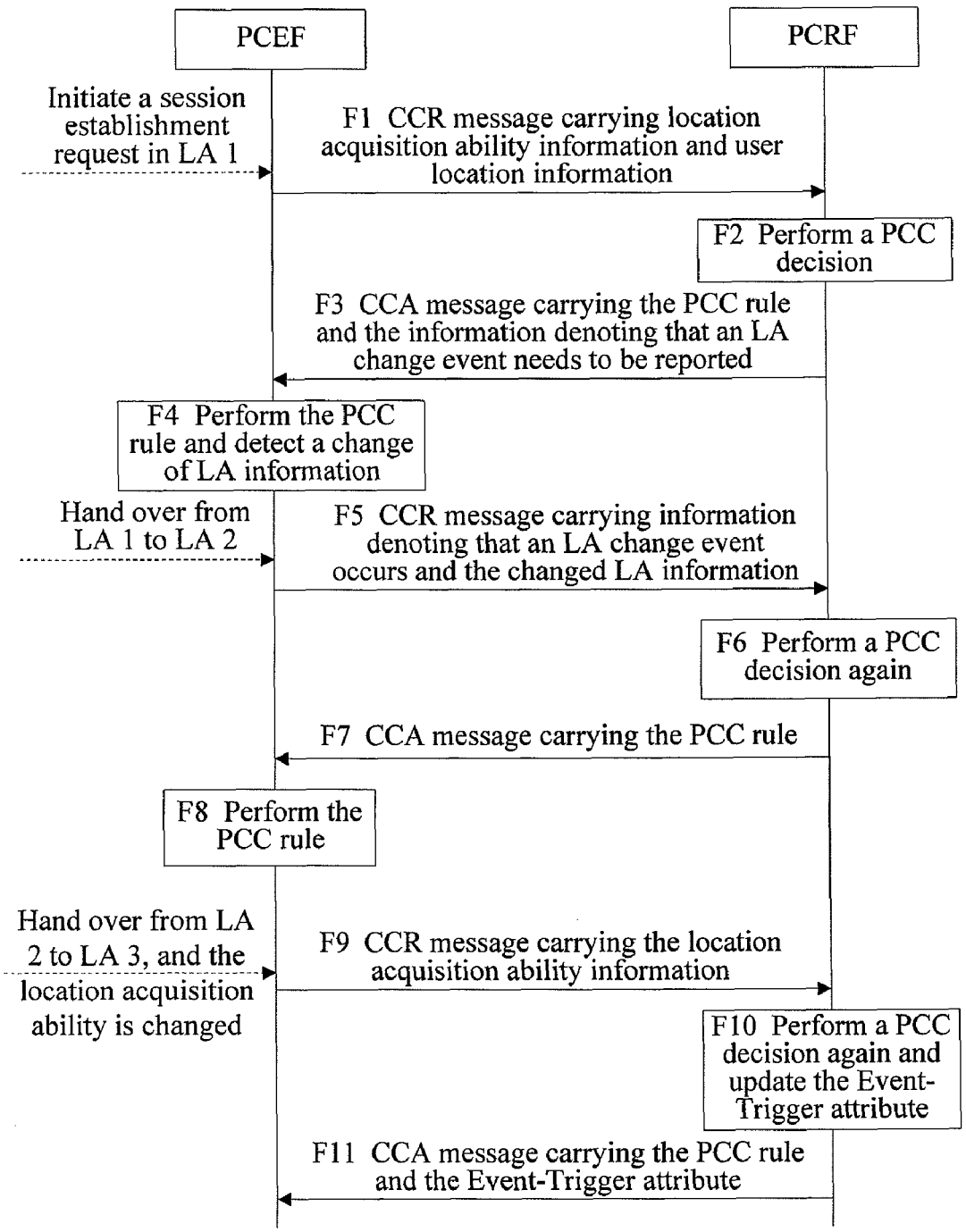

A sixth embodiment of the method for implementing a PCC in the present disclosure is as follows. In this embodiment, the user is handed over between LAs in a WiMAX network. It is assumed that LA 1 has the location acquisition ability, LA 2 adjacent to LA 1 is an area having special QoS requirements (for example, the LA is an office area implementing high speed Internet access), and LA 3 adjacent to LA 2 does not have the location acquisition ability. A PCEF uses the third method described in the first embodiment when reporting a location acquisition ability to a PCRF, and the PCRF uses Method B described in the first embodiment when sending a trigger event list to the PCEF. Referring to the flow chart in FIG. 7, the process includes the following steps.

In F1, the user initiates an IP-CAN session establishment request in LA 1; after receiving the IP-CAN session establishment request message, the PCEF sends a CCR message carrying information denoting that it has the location acquisition ability and the current LA information to the PCRF.

The information denoting that it has the location acquisition ability may be carried in the CCR message by including a Location-Report-Ability attribute value pair having an attribute value of LOCATION_REPORT (1) in the CCR message, and the current LA information may be carried in the CCR message by carrying an attribute value pair denoting the current LA information in the message.

In F2, the PCRF makes a PCC decision to determine a PCC rule of the user according to the current LA information in the CCR message (the PCRF may also use the user subscription data, the operator's policy, and other information as reference when making the PCC decision).

In this embodiment, the PCRF judges that the user may enter LA 2 according to the current LA information in the CCR message and the preset adjacency relationship between the LAs. On the other hand, the PCRF can know that LA 2 is a cell having special QoS requirements according to the operator's policy. According to the above information, the PCRF can judge that the change of the LA where the user resides needs to be detected. According to the location acquisition ability information in the CCR message, it can be known that the PCEF has the ability of acquiring the LA information. Therefore, the PCRF carries information denoting that an LA change event needs to be reported in the generated CCA message.

The information denoting that an LA change event needs to be reported may be carried in the CCA message by carrying an attribute value LOCATION_CHANGE (x) in an Event-Trigger attribute of the CCA message.

In F3, the PCRF sends the CCA message carrying the determined PCC rule and the information denoting that an LA change event needs to be reported to the PCEF.

In F4, the PCEF performs a corresponding PCC according to the PCC rule in the CCA message, and detects a change of LA information of the user according to the information denoting that an LA change event needs to be reported in the CCA message.

In F5, after detecting that an LA change event occurs, the PCEF sends a CCR message to the PCRF to report that the LA change event occurs and report the changed LA information.

That the LA change event occurs may be reported by carrying an attribute value LOCATION_CHANGE (x) in an Event-Trigger attribute of the CCR message, and the changed LA information may be reported by carrying an attribute value pair denoting the changed LA information in the CCR message.

In F6, the PCRF makes a PCC decision again to determine a current PCC rule of the user according to the LA change event and/or the changed LA information in the CCR message (the PCRF may also use the user subscription data, the operator's policy, and other information as reference when making the PCC decision again).

When the LA change event detected by the PCEF is generated because the user is handed over from LA 1 to LA 2, the changed LA information reported by the PCEF is LA information of Cell 2. Since the cell is a cell having special QoS requirements, the PCRF uses a corresponding special QoS policy in the determined PCC rule after making the PCC decision again.

In F7, the PCRF sends a CCA message including the determined PCC rule to the PCEF.

In F8, the PCEF performs a corresponding PCC according to the PCC rule in the CCA message.

In F9, after the user is handed over from LA 2 to LA 3, the PCEF confirms that it no longer has the ability of acquiring the user location information, and sends a CCR message carrying information denoting that the PCEF does not have the ability of acquiring the user location information to the PCRF.

The information denoting that the PCEF does not have the ability of acquiring the user location information may be carried in the CCR message by carrying the Location-Report-Ability attribute value pair having an attribute value of NONE (0) in the CCR message.

In F10, the PCRF makes a PCC decision again to determine a current PCC rule of the user according to the current LA information reported by the PCEF (the PCRF may also use the user subscription data, the operator's policy, and other information as reference when making the PCC decision again).

Since the PCEF does not have the ability of acquiring the user location information in LA 3 and the PCRF cannot acquire the user location information, the PCRF cannot make the PCC decision based on the user location information, but can only make the PCC decision again to determine the current PCC rule of the user according to other predetermined policies.

Further, the PCRF may also update the Event-Trigger attribute, so that the updated Event-Trigger attribute does not include the information denoting that the LA change event needs to be reported.

In F11, the PCRF sends a CCA message carrying the determined PCC rule and the updated Event-Trigger attribute to the PCEF.

In this embodiment, the LAs may specifically be WiMAX cells.

Those of ordinary skill in the art may understand that, all or a part of steps in the method according to the above embodiments may be implemented by using some hardware instructed by a program. The program may be stored in a computer readable storage media. When executed, the program may cause the operation of the following steps: acquiring user location information reported by a PCEF; determining a PCC rule of the user according to the acquired user location information and sending the PCC rule; and performing a corresponding PCC according to the PCC rule by the PCEF. Here, the storage media may be, for example, an ROM/RAM, a magnetic disk, or an optical disk.

Preferred embodiments of the PCEF, PCRF, gateway, and system for implementing a PCC provided in the present disclosure are described below.

Figure 8:
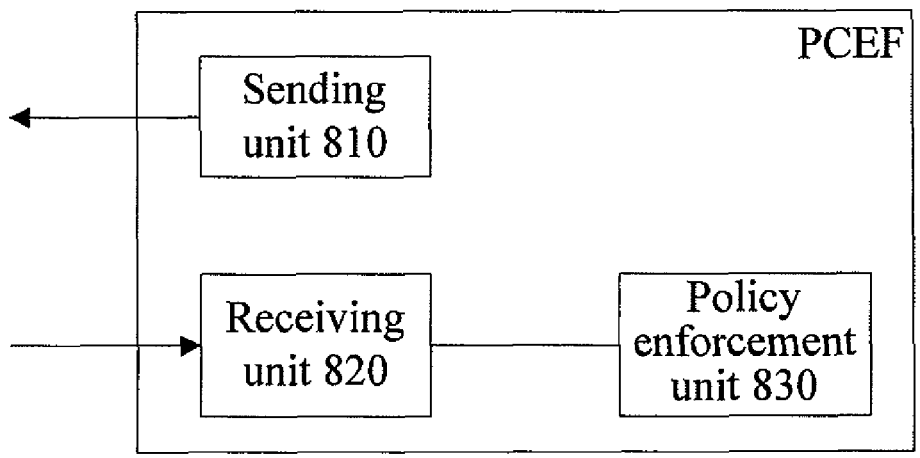
FIGS. 8-10 are respectively structural views of the first to the third embodiments of a PCEF of the present disclosure.

A first embodiment of the PCEF in the present disclosure is as follows. Referring to FIG. 8, the PCEF includes a sending unit 810, a receiving unit 820, and a policy enforcement unit 830.

The sending unit 810 is configured to send information to a PCRF including sending user location information to the PCRF when receiving a location information sending command.

The receiving unit 820 is configured to receive information sent by the PCRF including receiving a PCC rule determined by the PCRF according to the user location information.

The policy enforcement unit 830 is configured to perform a corresponding PCC according to the PCC rule received by the receiving unit 820.

Figure 9:
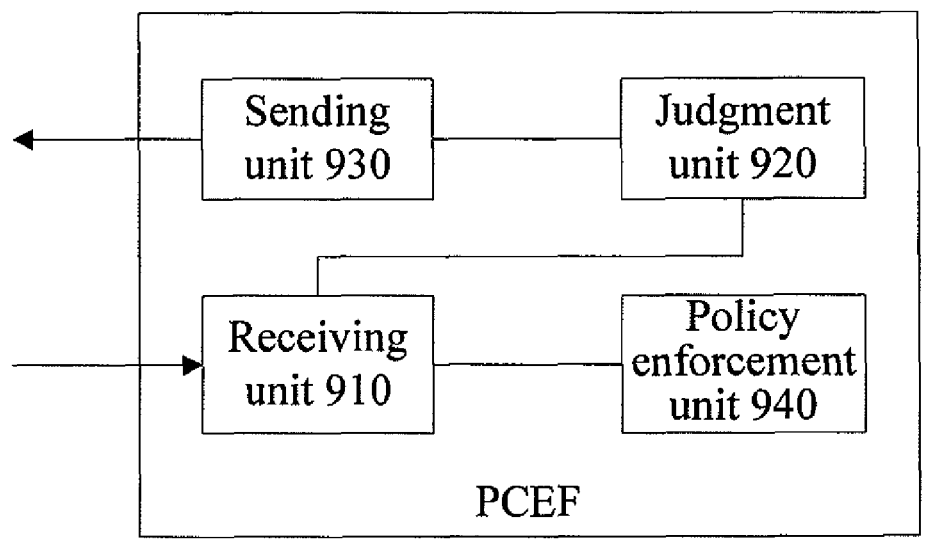

A second embodiment of the PCEF in the present disclosure is as follows. Referring to FIG. 9, the PCEF includes a receiving unit 910, a judgment unit 920, a sending unit 930, and a policy enforcement unit 940.

The receiving unit 910 is configured to receive information sent by a PCRF. The information includes a trigger event list including a user location information change event.

The judgment unit 920 is configured to judge whether user location information corresponding to the user location information change event indicated in the trigger event list is sent to the PCRF, and if not, to output a location information sending command to the sending unit 930.

The sending unit 930 is configured to send information to the PCRF including sending the user location information to the PCRF when receiving the location information sending command.

The information received by the receiving unit 910 further includes a PCC rule determined by the PCRF according to the user location information.

The policy enforcement unit 940 is configured to perform a corresponding PCC according to the PCC rule received by the receiving unit 910.

Figure 10:
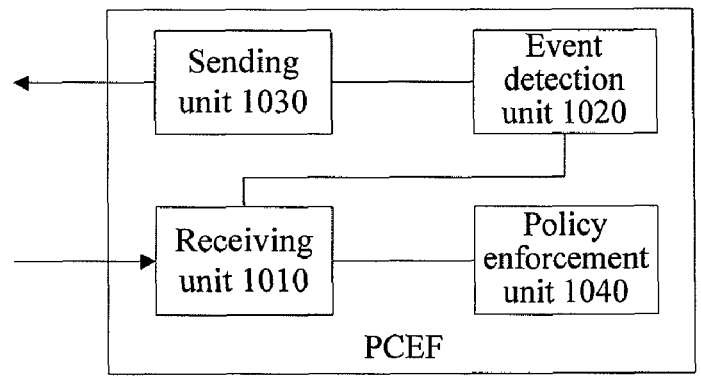

A third embodiment of the PCEF in the present disclosure is as follows. Referring to FIG. 10, the PCEF includes a receiving unit 1010, an event detection unit 1020, a sending unit 1030, and a policy enforcement unit 1040.

The receiving unit 1010 is configured to receive information sent by a PCRF. The information includes a trigger event list including a user location information change event.

The event detection unit 1020 is configured to detect whether the user location information change event indicated in the trigger event list occurs, and if yes, to output a location information sending command to the sending unit 1030.

The sending unit 1030 is configured to send information to the PCRF including sending changed user location information to the PCRF when receiving the location information sending command.

The information received by the receiving unit 1010 further includes a PCC rule determined by the PCRF according to the user location information.

The policy enforcement unit 1040 is configured to perform a corresponding PCC according to the PCC rule received by the receiving unit 1010.

In yet another embodiment of the PCEF in the present disclosure, the information sent by the sending unit further includes location acquisition ability information.

An embodiment of the present disclosure further provides a gateway that may include any PCEF described in the embodiments of the PCEF in the present disclosure. The gateway may be a gateway connected to a GPRS network, and/or a WiMAX network, and/or a Wireless Local Area Network (WLAN).

Figure 11:
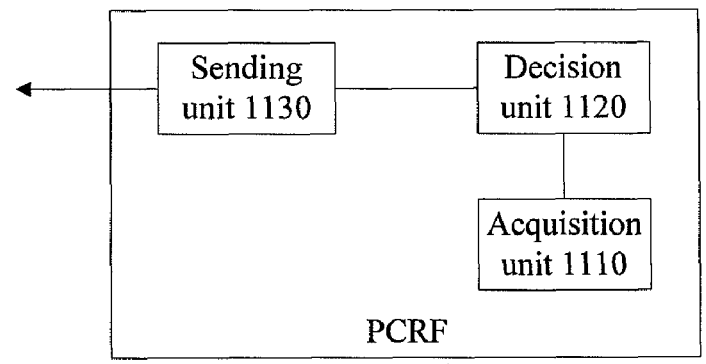
FIG. 11 is a structural view of the first embodiment of a PCRF of the present disclosure.

A first embodiment of the PCRF in the present disclosure is as follows. Referring to FIG. 11, the PCRF includes an acquisition unit 1110, a decision unit 1120, and a sending unit 1130.

The acquisition unit 1110 is configured to acquire information including user location information reported by a PCEF.

The decision unit 1120 is configured to determine a PCC rule of a user including determining the PCC rule of the user according to the user location information acquired by the acquisition unit 1110.

The sending unit 1130 is configured to send information to the PCEF. The information includes the PCC rule determined by the decision unit 1120.

In yet another embodiment of the PCRF in the present disclosure, the information sent by the sending unit further includes a trigger event list including a user location information change event.

In a further embodiment of the PCRF in the present disclosure, the information acquired by the acquisition unit further includes location acquisition ability information. The determining the PCC rule of the user by the decision unit further includes determining the PCC rule of the user according to the location acquisition ability information acquired by the acquisition unit.

In more embodiments of the PCRF in the present disclosure, the information sent by the sending unit further includes a trigger event list including a user location information change event.

In more embodiments of the PCRF in the present disclosure, the information acquired by the acquisition unit further includes location acquisition ability information. The user location information change event in the trigger event list sent by the sending unit is specifically determined according to the location acquisition ability information acquired by the acquisition unit.

Figure 12:
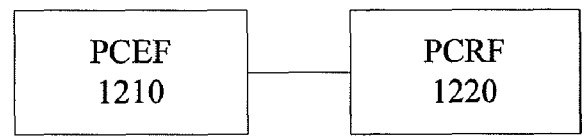
FIG. 12 is a structural view of the first embodiment of a system for implementing a PCC of the present disclosure.

A first embodiment of the system for implementing a PCC in the present disclosure is as follows. Referring to FIG. 12, the system includes a PCEF 1210 and a PCRF 1220.

The PCRF 1220 is configured to acquire user location information reported by the PCEF 1210, determine a PCC rule of a user according to the user location information, and send the PCC rule.

The PCEF 1210 is configured to receive the PCC rule and perform the corresponding PCC according to the rule.

In more embodiments of the system for implementing a PCC in the present disclosure, the PCEF may have features of any PCEF described in the embodiments of the PCEF in the present disclosure, and the PCRF may have features of any PCRF described in the embodiments of the PCRF in the present disclosure.

In the embodiments of the present disclosure, the PCC rule of the user may be generated according to the user location information reported by the PCEF, thereby performing a corresponding PCC according to the PCC rule. Since the user location information in the embodiments of the present disclosure is location information having a finer granularity than that of the IP address of the SGSN where the user resides and information of the mobile service network of the SGGN in the prior art, the PCC based on fine-granularity location information can be realized in the embodiments of the present disclosure.

Those of ordinary skill in the art may understand that, all or a part of steps in the method according to the above embodiments may be implemented by using some hardware instructed by a program. The program may be stored in a computer readable storage media. When executed, the program causes the operation of one or a combination of the steps in the embodiments of the method.

In addition, the functional units in various embodiments of the present disclosure may be integrated in a processing module or physically exist independently, or two or more units are integrated in a module. The above integrated module may be implemented in the form of a hardware or software functional module. If implemented in the form of the software functional module and sold or used as an independent product, the integrated module may also be stored in a computer readable storage media.

The storage media may be a read only memory (ROM), a magnetic disk, or an optical disk.

The above introduces the method for implementing a PCC, the PCEF, the PCRF, the gateway, and the system for implementing a PCC provided in the embodiments of the present disclosure in detail. Specific examples are used herein to illustrate the principle and implementation of the present disclosure. The illustration of the above embodiments is merely intended to help understand the method and concept of the present disclosure. It will be apparent to those of ordinary skill in the art that various modifications and variations can be made to the present disclosure without departing from the scope or spirit of the disclosure. In view of the foregoing, it is intended that the present disclosure cover modifications and variations of the present disclosure provided that they fall within the scope of the following claims and their equivalents.

What is claimed is:

1. A method for implementing a Policy and Charging Control (PCC), comprising:
    acquiring, by a Policy and Charging Rules Function (PCRF), user location acquisition ability information carried in a Credit-Control-Request (CCR) message sent by a Policy and Charging Enforcement Function (PCEF), wherein the user location acquisition ability information comprises a user location information attribute value pair denoting whether the PCEF have an ability of acquiring user location information; and
    determining, by the PCRF, a PCC rule of a user according to the user location acquisition ability information, in which the PCC rule is for (the PCEF to perform a corresponding PCC.

2. The method for implementing the PCC according to claim 1, wherein the user location information attribute value pair comprises attribute value denoting that the PCEF does not have the ability of acquiring the user location information.

3. The method for implementing the PCC according to claim 2, wherein the user location information attribute value pair is Routing Area Identity (RAI) attribute value pair or 3GPP-User-Location-Info attribute value pair.

4. A Policy and Charging Enforcement Function (PCEF), comprising:
    a sending unit, configured to send user location acquisition ability information to a Policy and Charging Rules Function (PCRF), wherein the user location acquisition ability information is carried in a Credit-Control-Request (CCR) message and the user location acquisition ability information comprises a user location information attribute value pair denoting whether the PCEF have an ability of acquiring user location information;
    a receiving unit, configured to receive a Policy and Charging Control (PCC) rule determined by the PCRF according to the user location acquisition ability information; and
    a policy enforcement unit, configured to perform a corresponding PCC according to the PCC rule received by the receiving unit.

5. The PCEF according to claim 4, wherein the attribute value is specific value denoting that the PCEF does not have the ability of acquiring the user location information.

6. The PCEF according to claim 5, wherein the user location information attribute value pair is Routing Area Identity (RAI) attribute value pair or 3GPP-User-Location-Info attribute value pair.

7. A Policy Control and Charging Rules Function (PCRF), comprising:
    an acquisition unit, configured to acquire user location acquisition ability information carried in a Credit-Control-Request (CCR) message reported by a Policy and Charging Enforcement Function (PCEF), wherein the user location acquisition ability information comprises a user location information attribute value pair whose attribute value denote whether the PCEF have an ability of acquiring user location information;
    a decision unit, configured to determine a Policy and Charging Control (PCC) rule of a user according to the user location acquisition ability information acquired by the acquisition unit; and
    a sending unit, configured to send information to the PCEF, wherein the information comprises the PCC rule determined by the decision unit.

8. The PCRF according to claim 7, wherein the attribute value is specific value denoting that the PCEF does not have the ability of acquiring the user location information.

9. The PCRF according to claim 8, wherein the user location information attribute value pair is Routing Area Identity (RAI) attribute value pair or 3GPP-User-Location-Info attribute value pair.

10. A system for implementing a Policy and Charging Control (PCC), comprising a Policy and Charging Enforcement Function (PCEF) and a Policy Control and Charging Rules Function (PCRF), wherein
    the PCEF is configured to send user location acquisition ability information to the PCRF, wherein the user location acquisition ability information is carried in a Credit-Control-Request (CCR) message and the user location acquisition ability information comprises a user location information attribute value pair denoting whether the PCEF have an ability of acquiring user location information; and receive a PCC rule sent from the PCRF and perform a corresponding PCC according to the PCC rule; and
    the PCRF is configured to acquire the user location acquisition ability information sent by the PCEF, determine the PCC rule of a user according to the user location acquisition ability information, and send the PCC rule to the PCEF.

11. The system according to claim 10, wherein the attribute value is specific value denoting that the PCEF does not have the ability of acquiring the user location information.

12. The system according to claim 11, wherein the user location information attribute value pair is Routing Area Identity (RAI) attribute value pair or 3GPP-User-Location-Info attribute value pair.

* * * * *